United States Patent
Matsuo (10) Patent No.: US 10,423,144 B2
(45) Date of Patent: Sep. 24, 2019

(54) LADDER-LIBRARY MANAGEMENT APPARATUS

(71) Applicant: FANUC CORPORATION, Yamanashi (JP)

(72) Inventor: Toshiyuki Matsuo, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 31 days.

(21) Appl. No.: 15/792,547

(22) Filed: Oct. 24, 2017

(65) Prior Publication Data

US 2018/0129182 A1 May 10, 2018

(30) Foreign Application Priority Data

Oct. 28, 2016 (JP) .................. 2016-211458

(51) Int. Cl.
*G06F 12/06* (2006.01)
*G06F 13/12* (2006.01)
(Continued)

(52) U.S. Cl.
CPC ....... *G05B 19/054* (2013.01); *G05B 19/0426* (2013.01); *G05B 19/056* (2013.01);
(Continued)

(58) Field of Classification Search
CPC ...... G06F 3/0686; G06F 3/0605; G06F 16/41; G06F 8/65; G05B 2219/21053; G05B 2219/25296
(Continued)

(56) References Cited

U.S. PATENT DOCUMENTS

2002/0083228 A1 6/2002 Chiloyan et al.
2002/0133240 A1 9/2002 Nagao et al.
(Continued)

FOREIGN PATENT DOCUMENTS

DE 102014118546 A1 6/2016
EP 1225744 A2 7/2002
(Continued)

OTHER PUBLICATIONS

Japanese Decision to Grant a Patent dated Mar. 20, 2018, for Japanese Patent Application No. 2016-211458.
(Continued)

*Primary Examiner* — Michael J Brown
(74) *Attorney, Agent, or Firm* — Karceski IP Law, PLLC (57) ABSTRACT

A ladder-library management apparatus that manages a library used in a machine connected via a network includes an incorporated-information storage area that stores incorporated information in which the machine is associated with identification information of a device connected to the machine and a version number of the library used for the device, a library storage area that stores library data in which the identification information, information about the device, and information about the library are associated with each other, and a library server that adds or updates the library provided in the machine on the basis of the library data stored in the library storage area and that updates the incorporated information stored in the incorporated-information storage area.

4 Claims, 9 Drawing Sheets

(51) Int. Cl.
  *G05B 19/05* (2006.01)
  *G05B 19/042* (2006.01)
  *G06F 8/65* (2018.01)
  *G06F 16/41* (2019.01)
  *G06F 9/4401* (2018.01)

(52) U.S. Cl.
  CPC ........ *G06F 12/0646* (2013.01); *G06F 13/128* (2013.01); *G05B 2219/21053* (2013.01); *G05B 2219/25296* (2013.01); *G06F 9/4411* (2013.01)

(58) Field of Classification Search
  USPC .......................................................... 700/1
  See application file for complete search history.

(56) References Cited

U.S. PATENT DOCUMENTS

| | | | |
|---|---|---|---|
| 2004/0123270 A1* | 6/2004 | Zhuang | G06F 8/65 717/118 |
| 2013/0036090 A1* | 2/2013 | Akiyama | G06F 11/2094 707/624 |
| 2014/0089583 A1* | 3/2014 | Hayakawa | G06F 3/0686 711/115 |
| 2016/0170397 A1 | 6/2016 | Takehisa | |
| 2016/0209823 A1 | 7/2016 | Hotta | |
| 2017/0351508 A1 | 12/2017 | Jahn et al. | |

FOREIGN PATENT DOCUMENTS

| | | |
|---|---|---|
| JP | 2000315149 A | 11/2000 |
| JP | 3275968 B2 | 4/2002 |
| JP | 2002268983 A | 9/2002 |
| JP | 2002269024 A | 9/2002 |
| JP | 2008226005 A | 9/2008 |
| JP | 2011170419 | 9/2011 |
| JP | WO2015045004 A1 | 5/2016 |
| JP | 2015045004 A1 | 3/2017 |
| WO | 2015186178 A1 | 12/2012 |

OTHER PUBLICATIONS

German Office Action dated Apr. 3, 2019, for German Patent Application No. 102017124730.0.

* cited by examiner

| NUMBER | INCORPORATED INFORMATION | |
|---|---|---|
| | MACHINE | IDENTIFICATION INFORMATION AND LIBRARY VERSION |
| 1 | MACHINE #1 | ID001, 7.5; ID032, 1.2 |
| 2 | MACHINE #2 | ID032, 1.2; ID5852, 3.5 ; ID001, 7.5 |
| 3 | MACHINE #3 | ID032, 1.2; |
| ... | ... | ... |

FIG. 4

| NUMBER | LIBRARY DATA | | |
|---|---|---|---|
| | IDENTIFICATION INFORMATION | DEVICE INFORMATION | LIBRARY INFORMATION |
| 1 | ID001 | DEVICE INFORMATION OF ID001 | LIBRARY FOR ID001 |
| 2 | ID032 | DEVICE INFORMATION OF ID032 | LIBRARY FOR ID032 |
| 3 | ID5852 | DEVICE INFORMATION OF ID585 | LIBRARY FOR ID5852 |
| 4 | ID7629 | DEVICE INFORMATION OF ID7629 | LIBRARY FOR ID7629 |
| ... | ... | ... | ... |

FIG. 5

| NUMBER | IDENTIFICATION INFORMATION |
|---|---|
| 1 | ID032 |
| 2 | – |

FIG. 11 though it may be stored in an auxiliary storage device.

LADDER-LIBRARY MANAGEMENT APPARATUS

CROSS-REFERENCE TO RELATED APPLICATIONS

This application claims the benefit of and priority to Japanese Patent Application No. 2016-211458, filed on Oct. 28, 2016, the entire content of which is incorporated herein by reference.

FIELD OF THE INVENTION

The present invention relates to a ladder-library management apparatus that is suitable for use in managing a library incorporated into a ladder program included in a machine connected via a network.

BACKGROUND OF THE INVENTION

In the related art, there are known programmable controllers that automatically incorporate a device driver for a connected sensor, a robot, or the like, thus realizing a plug-and-play function suitable for system construction (for example, see Publication of Japanese Patent No. 5921781).

SUMMARY OF THE INVENTION

The present invention provides the following solutions.

According to one aspect, the present invention provides a ladder-library management apparatus that manages a library incorporated into a ladder program used in a machine connected via a network, the ladder-library management apparatus including: an incorporated-information storage area that stores incorporated information in which the machine is associated with identification information of a device connected to the machine and a version number of the library used for the device; a library storage area that stores library data in which the identification information, information about the device having the identification information, and information about the library used in the device having the identification information are associated with each other; and a library server that adds or updates the library provided in the machine on the basis of the library data stored in the library storage area and that updates the incorporated information stored in the incorporated-information storage area.

DESCRIPTION OF EMBODIMENTS OF THE INVENTION

A ladder-library management apparatus and a ladder-library management system according to one embodiment of the present invention will be described below with reference to the drawings.

Figure 1:
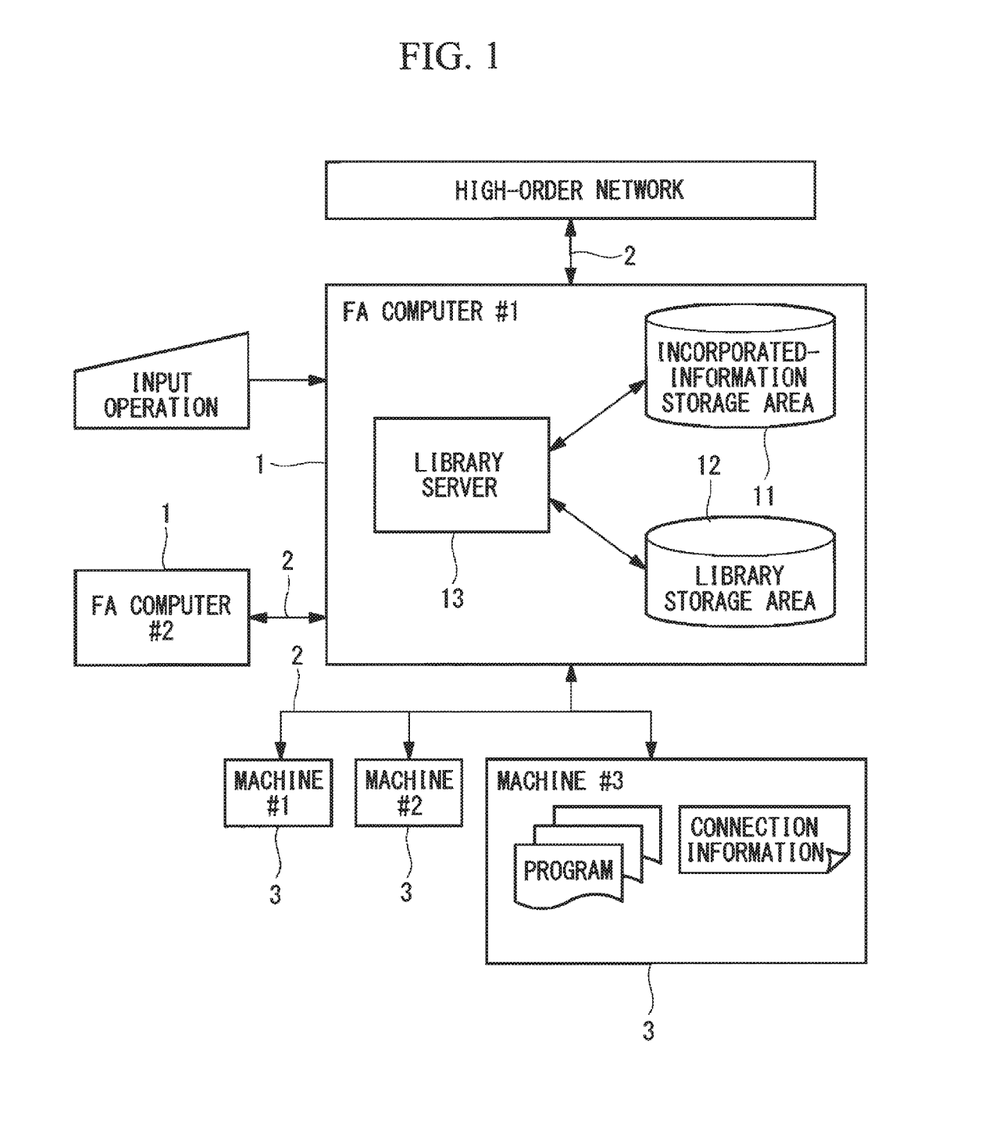
FIG. 1 is a block diagram showing, in outline, the configurations of a ladder-library management apparatus and a ladder-library management system according to one embodiment of the present invention.

As shown in FIG. 1, the ladder-library management system is provided with: a ladder-library management apparatus 1 that is referred to as FA (Factory Automation) computer #1; machines 3, such as robots, machine tools, or programmable controllers, that are referred to as machine #1 to machine #3 and that are connected via a communication network (network) 2, such as Ethernet (registered trademark) or FL-NET; and another ladder-library management apparatus 1 that is connected via a communication network 2 and that is referred to as FA computer #2 having the same configuration as FA computer #1.

Note that, in FIG. 1, for the sake of explanation, although the three machines 3, which are referred to as machine #1 to machine #3, are connected to the ladder-library management apparatus 1, which is referred to as FA computer #1, the number of machines is not limited thereto, and one or more machines 3 can be connected to the ladder-library management apparatus 1.

Furthermore, in FIG. 1, although a connection of FA computer #1 and FA computer #2 is shown as a connection of the ladder-library management apparatuses 1, additional other ladder-library management apparatuses 1 can be connected.

Furthermore, as shown in FIG. 1, the ladder-library management apparatus 1 may be connected to a higher-order network via a communication network 2.

The ladder-library management apparatus 1 is provided with: a processor (not shown); a main storage device, such as a ROM (Read Only Memory) and a RAM (Random Access Memory); an auxiliary storage device, such as an HDD (Hard Disk Drive); an external interface with which various types of data are exchanged with an external device; and the like. These devices in the ladder-library management apparatus 1 are connected to each other via a bus. Specifically, the ladder-library management apparatus 1 of this embodiment is provided with a computer.

The auxiliary storage device stores a program that provides the function of a library server 13 of this embodiment and data that includes an incorporated-information storage area 11 and a library storage area 12. The processor reads the program and the data from the auxiliary storage device to the main storage device and executes the program, thereby realizing various types of processing to be described below.

As shown in FIG. 1, the library server 13 is functionally connected to the incorporated-information storage area 11 and the library storage area 12.

Figure 3:
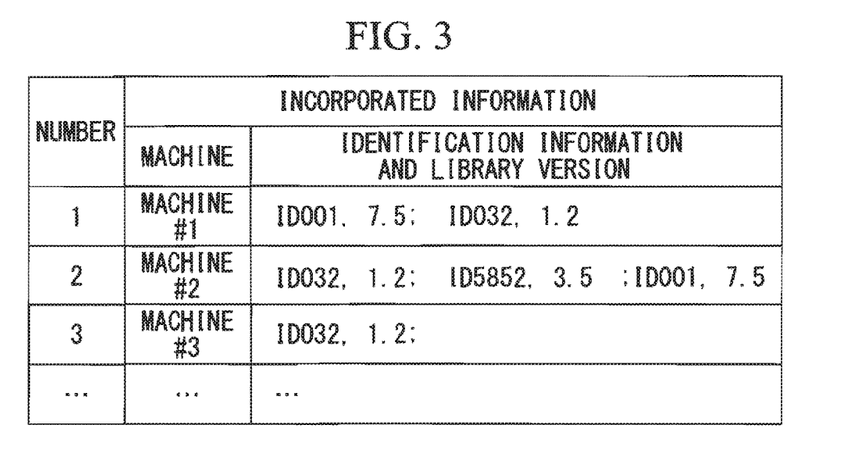
FIG. 3 is a view for explaining a table stored in an incorporated-information storage area.

The incorporated-information storage area 11 stores information about I/O devices incorporated into the respective machines 3 and information about the version numbers of libraries in use. As shown in FIG. 3, the incorporated-information storage area 11 stores a table in which the number serving as an index, reference information of the machines connected via the communication network 2, and identification information of the I/O devices connected to the machines and the version numbers of libraries incorporated into the machines in order to use the I/O devices are associated with each other. Specifically, in FIG. 3, it is shown that I/O devices referred to as ID001 and ID032 are connected to machine #1, and the version numbers of libraries therefor are 7.5 and 1.2. It is shown that I/O devices referred to as ID032, ID5852, and ID001 are connected to machine #2, and the version numbers of libraries therefor are 1.2, 3.5, and 7.5. It is shown that an I/O device referred to as ID032 is connected to machine #3, and the version number of a library therefor is 1.2. Note that the number serving as an index may be omitted.

Figure 4:
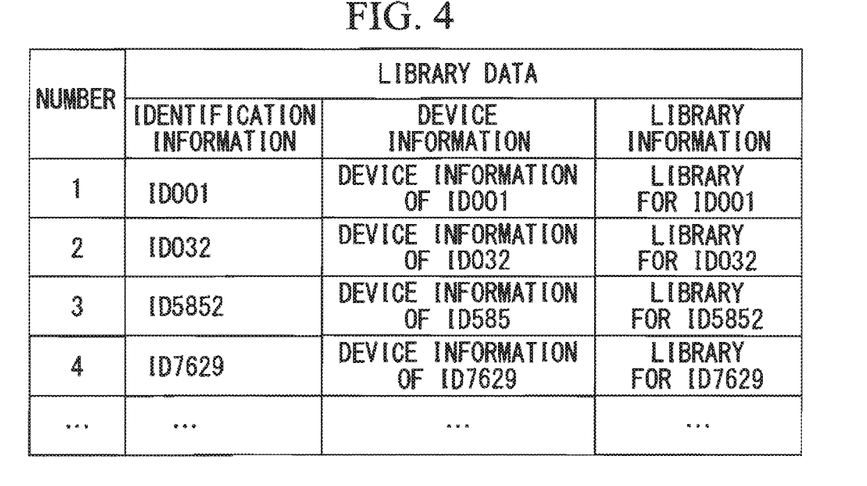
FIG. 4 is a view for explaining a table stored in a library storage area.

The library storage area 12 stores libraries that are necessary to use various I/O devices. As shown in FIG. 4, the library storage area 12 stores a table in which the number serving as an index, identification information of I/O devices, device information that has stored information about the I/O devices, and library information about libraries used in the I/O devices are associated with each other. The device information stores, for example, the occupancy size of an I/O device and input/output signal information of the I/O device. The library information stores, for example, a library body, the version number of the library, and input/output signal information used for using the function provided by the library. Note that the number serving as an index may be omitted.

The library server 13 is configured to add or update, as needed, libraries used in ladder programs provided in the respective machines 3 on the basis of the library data stored in the library storage area 12 and to update incorporated information stored in the incorporated-information storage area 11.

The configuration of the library server 13 will be described in detail below with reference to FIG. 2.

Figure 2:
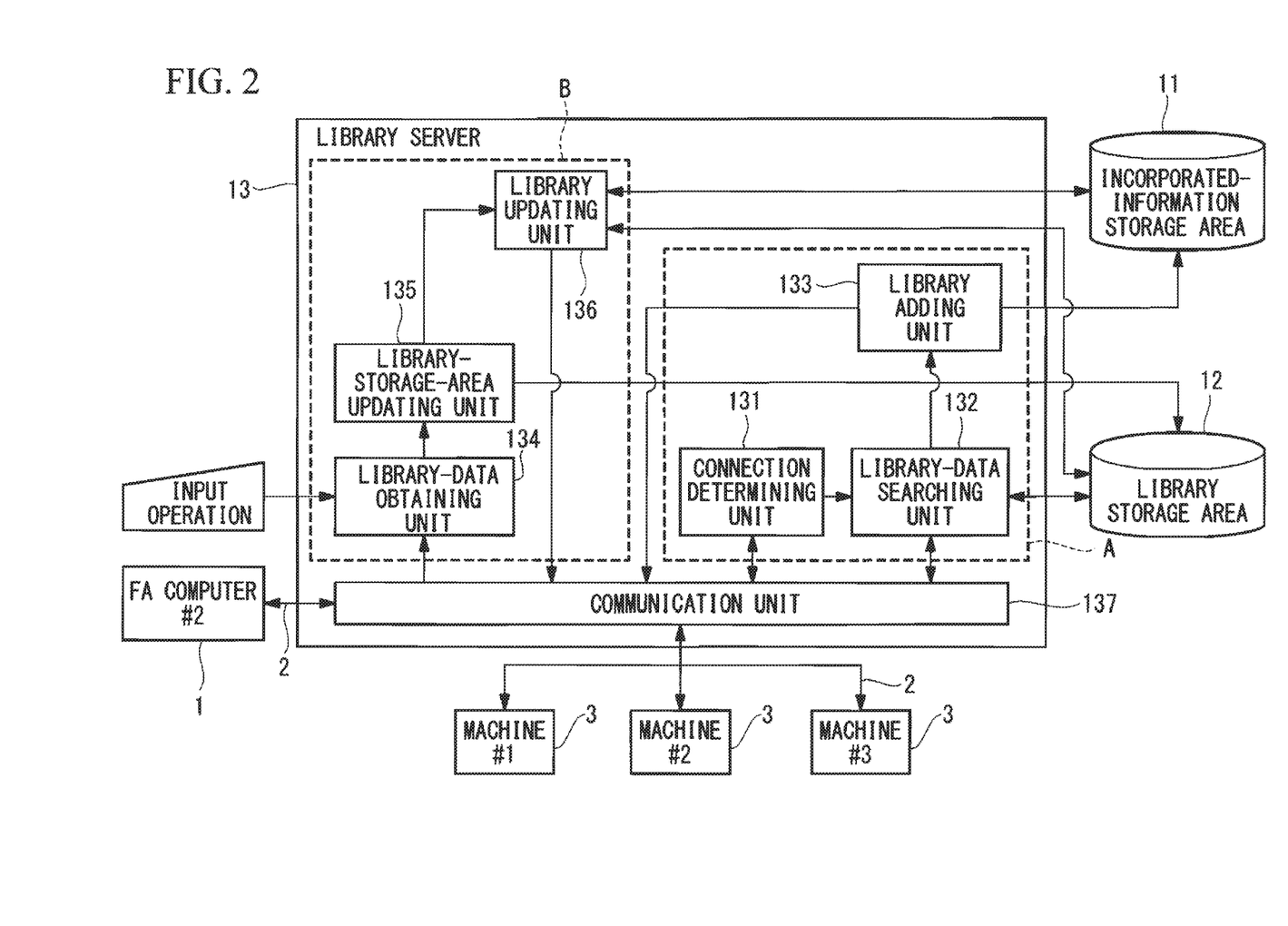
FIG. 2 is a block diagram showing, in outline, the configuration of the ladder-library management apparatus shown in FIG. 1.

As shown in FIG. 2, the library server 13 is provided with: a function block A that includes a connection determining unit 131, a library-data searching unit 132, and a library adding unit 133; a function block B that includes a library-data obtaining unit 134, a library-storage-area updating unit 135, and a library updating unit 136; and a communication unit 137 that exchanges data, via the communication networks 2, with the machines 3, which are referred to as machine #1 to machine #3, the other ladder-library management apparatus 1, which is referred to as FA computer #2, and the high-order network (see FIG. 1).

In this embodiment, although the library server 13 is provided with both the function block A and the function block B, the present invention is not limited thereto, and the library server 13 may be configured to include only the function block A, i.e., the connection determining unit 131, the library-data searching unit 132, and the library adding unit 133. Furthermore, the library server 13 may be configured to include only the function block B, i.e., the library-data obtaining unit 134, the library-storage-area updating unit 135, and the library updating unit 136.

The function block A is configured to, when a new I/O device is added to any of the machines 3, search for a library necessary for the added I/O device and to add the searched-for library to a ladder program included in the machine 3, thus updating the ladder program.

As shown in FIG. 2, the connection determining unit 131 is connected to the library-data searching unit 132 and the communication unit 137. The library-data searching unit 132 is connected to the library storage area 12, the library adding unit 133, and the communication unit 137. The library adding unit 133 is connected to the incorporated-information storage area 11 and the communication unit 137.

Figure 5:
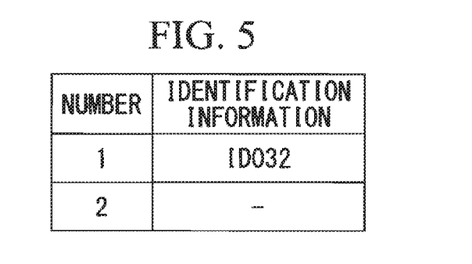
FIG. 5 is a view for explaining a table of connection information provided in a machine.

The connection determining unit 131 is configured to obtain connection information of the I/O devices held by the machines 3, which are connected to the network via the communication unit 137, and to periodically determine whether the obtained connection information differs from the previously obtained connection information by comparing them. As shown in FIG. 5, the connection information is stored in the form of a table in which the number serving as an index and identification information of an I/O device are associated with each other. Note that the number serving as an index may be omitted.

For example, when an I/O device, such as a temperature sensor, is connected to any of the machines 3, because the identification information of the new I/O device is added to the connection information, the identification information of the added I/O device can be identified from the difference from the previously obtained connection information. FIG. 5 shows that the I/O device identified by ID032 is connected.

The library-data searching unit 132 is configured to search the library storage area 12 for library data that has identification information matching the identification information of the added I/O device. Furthermore, if library data that has identification information matching the identification information of the added I/O device cannot be found in the library storage area 12, the library-data searching unit 132 is configured to be able to request library data that has identification information matching the identification information of the added I/O device, from the other ladder-library management apparatus 1, which is referred to as FA computer #2, and the high-order network (see FIG. 1), which are connected to the network via the communication unit 137. If the corresponding library data is found in the other ladder-library management apparatus 1 or the high-order network, the library-data searching unit 132 adds this library data to the library storage area 12. If the corresponding library data is not found, this I/O device is treated as an unrecognizable I/O device, and the identification information thereof is saved in an error log.

The library adding unit 133 is configured to set a connection of the I/O device on the basis of the library data searched for by the library-data searching unit 132, to add the library to a ladder program provided in the corresponding machine 3, and to update the processing of the ladder program so as to use the function of the library.

Note that the library adding unit 133 may be implemented such that the function of updating ladder programs provided in advance in the machines 3 is incorporated therein, and the programs provided in the machines 3 are updated by using this function. Alternatively, it is also possible to install, in advance in the ladder-library management apparatus 1, special editing software for updating programs provided in the machines 3, to prepare, in the library data, a macro or batch in which procedures for activating the editing software and updating ladder programs are described, and to update the ladder programs provided in the machines 3 when the library adding unit 133 executes the macro or batch. Alternatively, the library adding unit 133 may issue a library adding request to a corresponding machine 3, and the machine 3 may update the ladder program so as to add the library, according to the library adding request.

Furthermore, the library adding unit 133 is configured to, after the ladder program is updated, add the identification information of the added I/O device and the library version number to the corresponding machine in the incorporated-information storage area 11.

The function block B is configured to, when a library in the library storage area 12 is updated to that having a new version number, replace the library incorporated into the ladder program of the machine in which the identical library having an old version number is used, with that having the new version number, to automatically update the ladder program.

As shown in FIG. 2, the library-data obtaining unit 134 is connected to the library-storage-area updating unit 135 and the communication unit 137. The library-storage-area updating unit 135 is connected to the library storage area 12 and the library updating unit 136. The library updating unit 136 is connected to the incorporated-information storage area 11, the library storage area 12, and the communication unit 137.

The library-data obtaining unit 134 is configured to obtain new library data through an input operation performed by an operator or from the other ladder-library management apparatus 1, which is referred to as FA computer #2, or the high-order network (see FIG. 1), which are connected to the network via the communication unit 137.

The library-storage-area updating unit 135 is configured to update the library storage area 12 on the basis of the library data obtained by the library-data obtaining unit 134. Specifically, the library-storage-area updating unit 135 is configured to search the library storage area 12 for library data that has identification information matching the identification information contained in the obtained library data. If identification information matching the identification information contained in the obtained library data is found in the library storage area 12, the library version number contained in the library information corresponding to the identification information contained in the obtained library data is compared with the library version number contained in the library information corresponding to the identification information found in the library storage area 12 and matching the identification information contained in the obtained library data. If the library version number in the obtained library data is newer than the library version number contained in the corresponding library information of the library data in the library storage area 12, the library data that has the identification information found in the library storage area 12 and matching the identification information contained in the obtained library data is updated to the obtained library data.

The library updating unit 136 is configured to, when the library storage area 12 is updated by the library-storage-area updating unit 135, obtain the identification information and the library version number, which are contained in the updated library data, and to search the incorporated-information storage area 11 for the incorporated information that has identification information matching the identification information contained in the updated library data, for each of the machines 3. If the incorporated information that has identification information matching the identification information contained in the updated library data is found, the library version number contained in the incorporated information is compared with the library version number of the updated library data. If the library version number contained in the incorporated information is old, the library updating unit 136 is configured to extract the machines 3 corresponding to the incorporated information, as machines 3 in which the library needs to be updated.

The library updating unit 136 is configured to decide, among the extracted machines 3 in which the library needs to be updated, a machine 3 in which the library is to be actually updated, according to a pre-given rule or an instruction from the operator, and to update, with respect to the decided machine 3, the update-target library incorporated into the ladder program of the machine 3. Here, the pre-given rule is, for example, a rule indicating that "all machines are to be updated", "a registered machine is a target for automatic updating", or the like. Furthermore, the instruction from the operator is a confirmation instruction indicating whether to perform an update or not, or the like.

Furthermore, the library updating unit 136 is configured to update, in the incorporated information corresponding to the decided machine 3 in the incorporated-information storage area 11, the library version number matching the identification information, thus making the library version number match the version number of the library actually incorporated into the ladder program of the decided machine 3.

Next, a ladder-library management method of this embodiment performed in the function block A of the library server 13, which has the above-described configuration, will be described with reference to FIGS. 6 and 7.

Figure 6:
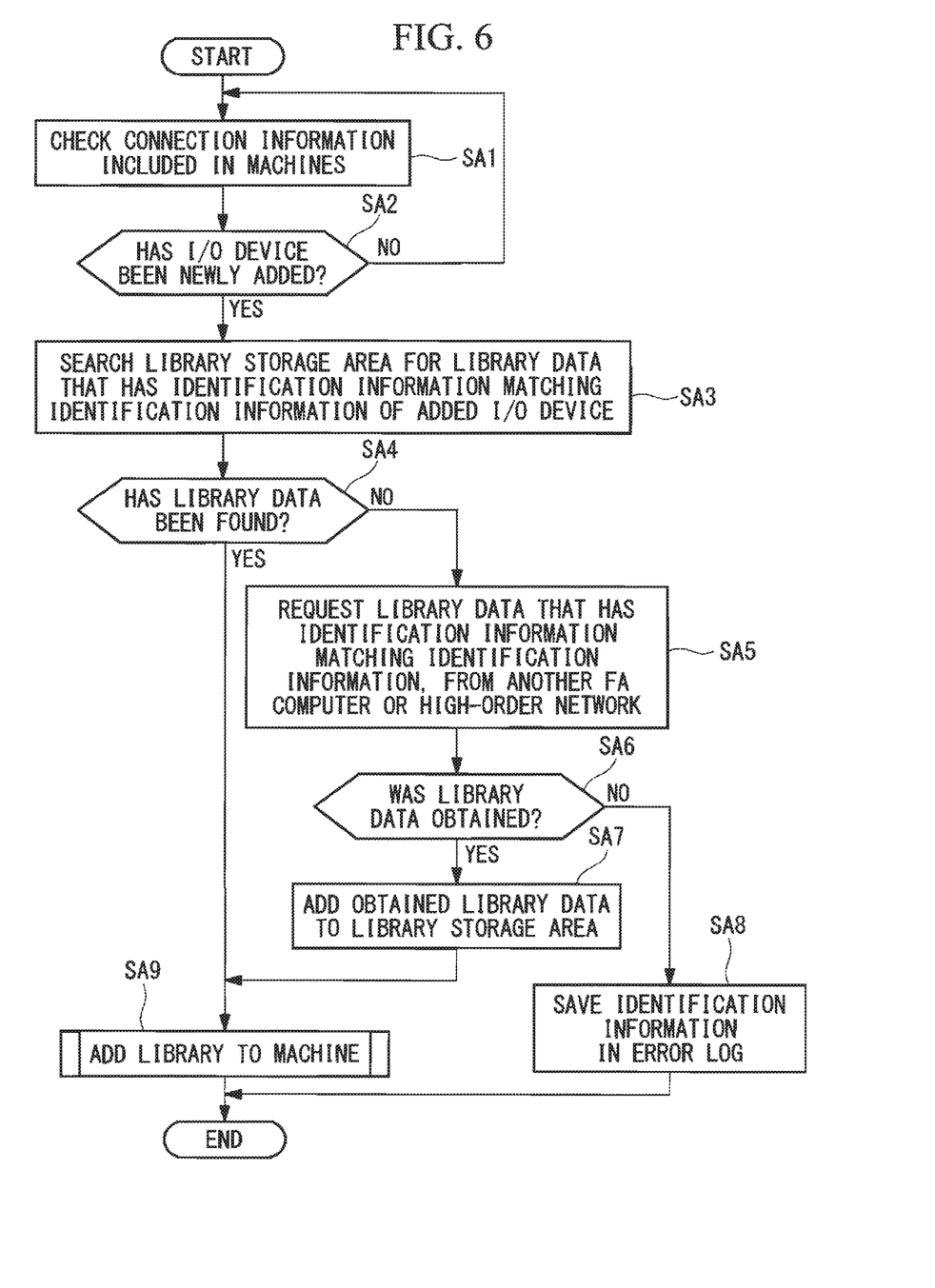
FIG. 6 is a flowchart showing processing performed in a library server when an I/O device is connected to the machine.
Figure 7:
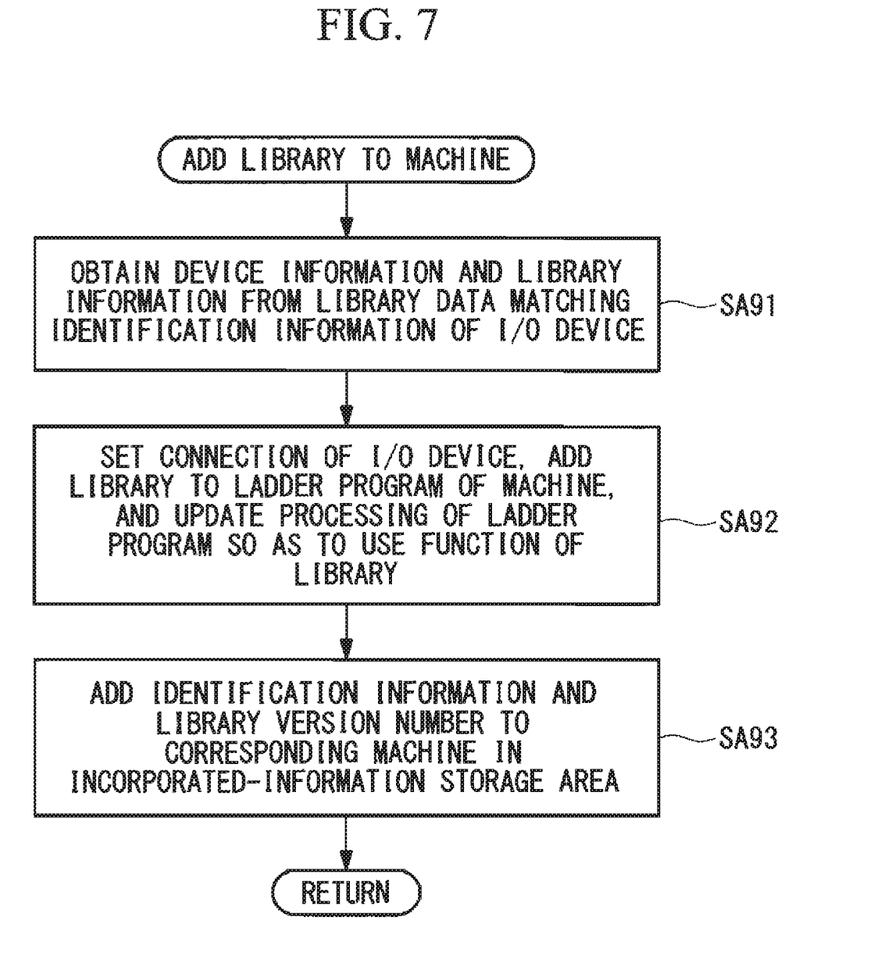
FIG. 7 is a flowchart showing subroutine processing performed in a step of adding a library to the machine, in the flowchart shown in FIG. 6.

First, in the connection determining unit 131, connection information of the I/O devices included in the machines 3 is periodically checked (Step SA1 in FIG. 6). Then, the presence or absence of a newly added I/O device is determined, and Step SA1 is repeated until a new I/O device is added (Step SA2 in FIG. 6).

Then, the library-data searching unit 132 searches the library storage area 12 for library data that has identification information matching the identification information of the added I/O device (Step SA3 in FIG. 6). Then, it is determined whether the corresponding library data has been found in the library storage area 12 (Step SA4 in FIG. 6).

If the corresponding library data has been found in the library storage area 12, the processing flow advances to Step SA9.

If the corresponding library data has not been found in the library storage area 12, the library-data searching unit 132 sends, to the other ladder-library management apparatus 1, which is referred to as FA computer #2, and the high-order network, which are connected to the network via the communication unit 137, an obtainment request for library data that has identification information matching the identification information of the added I/O device (Step SA5 in FIG. 6). It is determined whether the corresponding library data was obtained as a result (Step SA6 in FIG. 6). If the corresponding library data was obtained, the obtained library data is added to the library storage area 12 (Step SA7 in FIG. 6), the processing flow advances to Step SA9. If the corresponding library data was not obtained, the added I/O device is treated as an unrecognizable I/O device, the identification information thereof is saved in an error log (Step SA8 in FIG. 6), and the processing ends.

In Step SA9, the library adding unit 133 adds the library to the machine 3. More specifically, as shown in FIG. 7, first, device information and library information are obtained from the corresponding library data (Step SA91 in FIG. 7). Then, connection of the I/O device is set on the basis of the obtained device information and library information, the library is added to the ladder program of the machine 3, and the processing of the ladder program is updated so as to use the function of the library (Step SA92 in FIG. 7). After that, the identification information and the library version number are added to the corresponding machine 3 in the incorporated-information storage area 11 (Step SA93 in FIG. 7).

By doing so, when an I/O device is connected to the machine 3, it is possible to automatically search for the library required by the I/O device and to update the ladder program provided in the machine 3. As a result, there is no need to manually update the ladder program of the machine 3, thus making it possible to enhance the maintainability of the library.

Next, a ladder-library management method of this embodiment performed in the function block B of the library server 13, which has the above-described configuration, will be described with reference to FIGS. 8 to 11.

Figure 8:
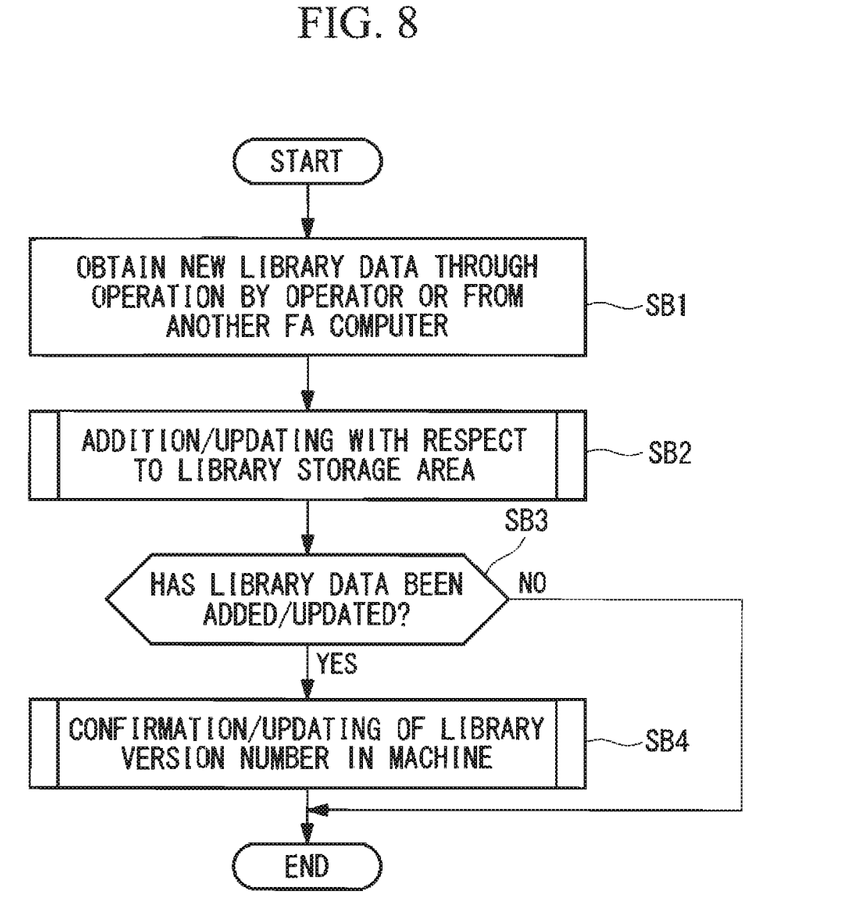
FIG. 8 is a flowchart showing processing performed in the library server when the library is updated.

First, in the library-data obtaining unit 134, new library data is obtained through an input operation performed by the operator or from the other ladder-library management apparatus 1, which is referred to as FA computer #2, or the high-order network (see FIG. 1) (Step SB1 in FIG. 8).

Then, the library-storage-area updating unit 135 performs addition/updating of the library data with respect to the library storage area 12 on the basis of the obtained library data (Step SB2 in FIG. 8).

Figure 9:
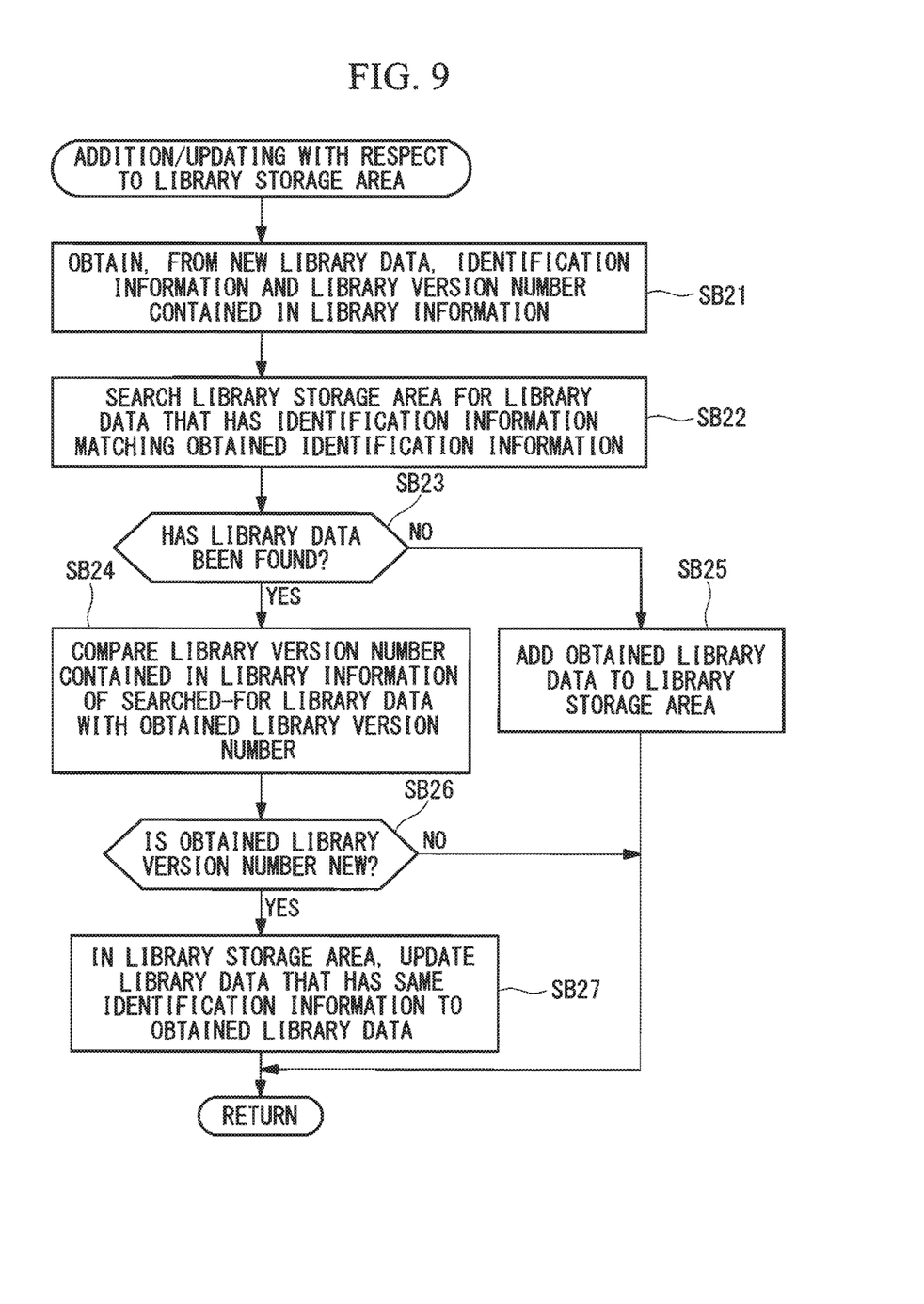
FIG. 9 is a flowchart showing subroutine processing performed in a step of adding/updating library data to the library storage area, in the flowchart shown in FIG. 8.

More specifically, as shown in FIG. 9, in the addition/updating with respect to the library storage area 12, first, the identification information and the library version number contained in the library information are obtained from the obtained new library data (Step SB21 in FIG. 9). Then, the library storage area 12 is searched for library data that has identification information matching the obtained identification information (Step SB22 in FIG. 9). It is determined whether the corresponding library data has been found (Step SB23 in FIG. 9). If library data that has identification information matching the obtained identification information has not been found in the library storage area 12, the obtained library data is added to the library storage area 12 (Step SB25 in FIG. 9), and the subroutine processing ends. If library data that has identification information matching the obtained identification information has been found in the library storage area 12, the library version number contained in the library information of the library data searched for in the library storage area 12 is compared with the library version number of the obtained library data (Step SB24 in FIG. 9). If the library version number of the obtained library data is older than or is the same as the library version number contained in the library information of the library data searched for in the library storage area 12, the subroutine processing ends. If the library version number of the obtained library data is newer than the library version number contained in the library information of the library data searched for in the library storage area 12 (Step SB26 in FIG. 9), the library data, in the library storage area 12, that has identification information matching the obtained library data is updated to the obtained library data (Step SB27 in FIG. 9), and the subroutine processing ends.

Next, the flow returns to FIG. 8, and it is determined whether the addition/updating of the library data with respect to the library storage area 12 has been performed (Step SB3 in FIG. 8). If the addition/updating of the library data with respect to the library storage area 12 has not been performed, the processing ends. On the other hand, if the addition/updating of the library data with respect to the library storage area 12 has been performed, the library updating unit 136 performs confirmation/updating of the library version number in the machine 3 (Step SB4 in FIG. 8).

Figure 10:
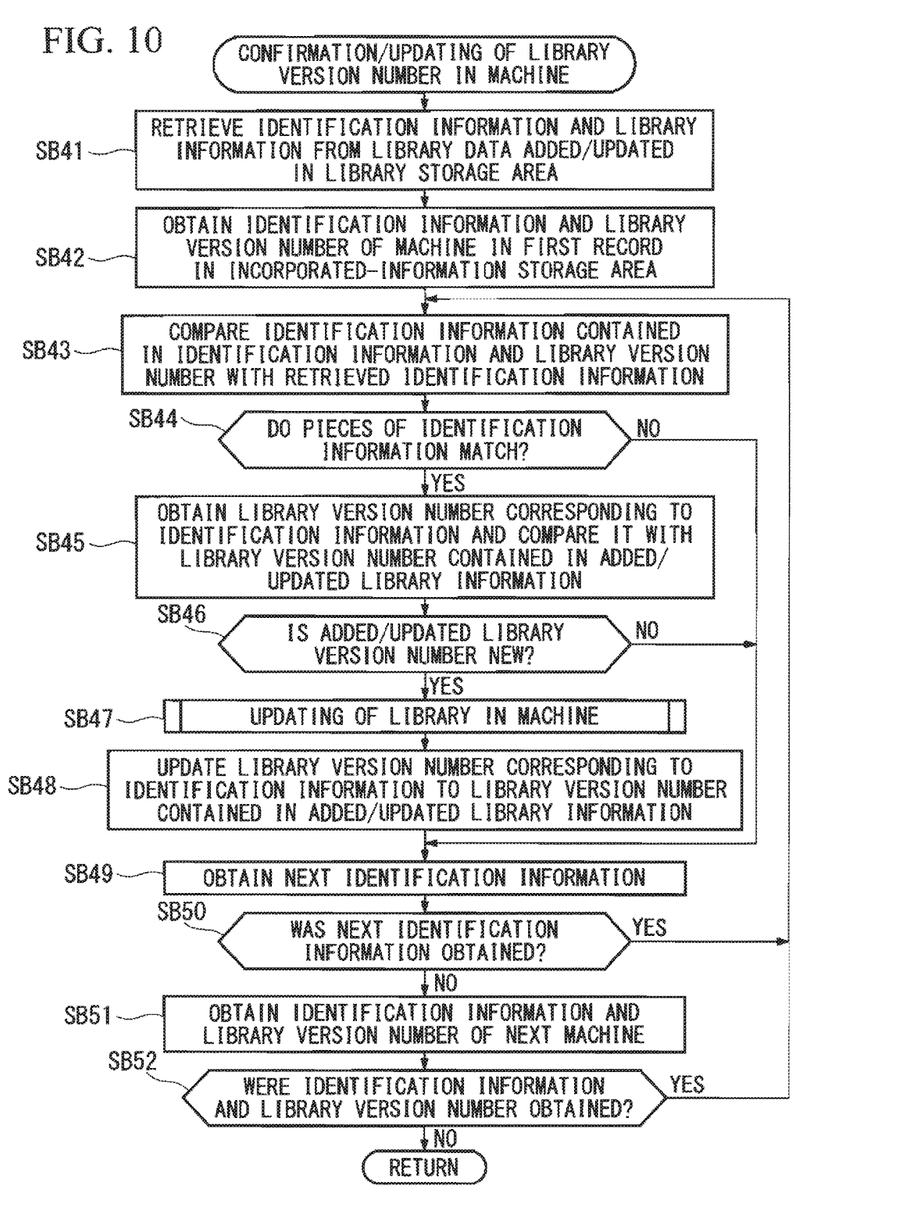
FIG. 10 is a flowchart showing subroutine processing performed in a step of confirming/updating a library version number in the machine, in the flowchart shown in FIG. 8.

More specifically, in the confirmation/updating of the library version number in the machine 3, as shown in FIG. 10, first, the identification information and the library information are retrieved from the library data that has been added/updated in the library storage area 12 (Step SB41 in FIG. 10). Next, the reference information and the identification information and library version number of the machine 3 in the first record in the incorporated-information storage area 11 are obtained (Step SB42 in FIG. 10). Then, the identification information contained in the identification information and library version number in the incorporated-information storage area 11 is compared with the identification information retrieved from the library data in the library storage area 12 (Step SB43 in FIG. 10). It is determined whether the identification information contained in the identification information and library version number in the incorporated-information storage area 11 matches the identification information retrieved from the library data in the library storage area 12 (Step SB44 in FIG. 10). If these pieces of identification information do not match, next identification information is obtained (Step SB49 in FIG. 10). If these pieces of identification information match, the library version number corresponding to the identification information in the incorporated-information storage area 11 is obtained and is compared with the library version number contained in the library information in the added/updated library data (Steps SB45 and SB46 in FIG. 10). Then, if the library version number contained in the library information in the added/updated library data is older than or is the same as the library version number corresponding to the identification information in the incorporated-information storage area 11, next identification information is obtained (Step SB49 in FIG. 10). If the library version number contained in the library information in the added/updated library data is newer than the library version number corresponding to the identification information in the incorporated-information storage area 11, the library in the machine 3 is updated (Step SB47 in FIG. 10).

Figure 11:
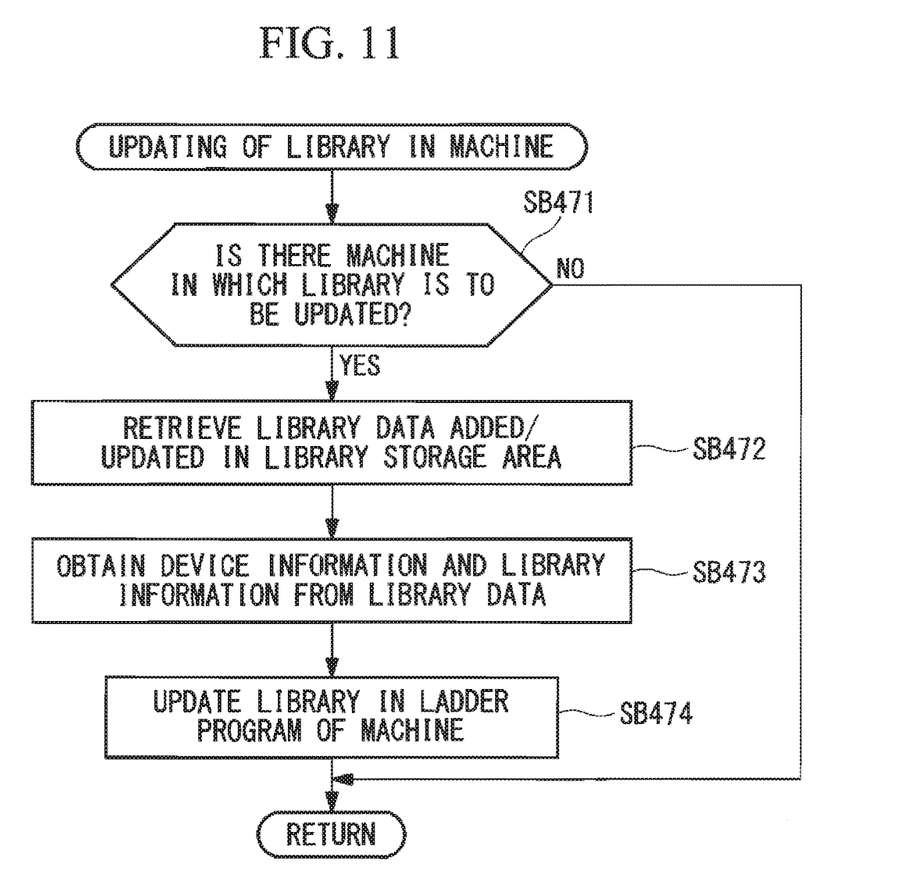
FIG. 11 is a flowchart showing subroutine processing performed in a step of updating the library in the machine, in the flowchart shown in FIG. 10.

More specifically, in the updating of the library in the machine 3, as shown in FIG. 11, first, it is determined whether there is a machine 3 in which the library is to be updated (Step SB471 in FIG. 11). If there is no machine 3 in which the library is to be updated, the subroutine processing ends. If there is a machine 3 in which the library is to be updated, the library data added/updated in the library storage area 12 is retrieved (Step SB472 in FIG. 11). Then, the device information and the library information are obtained from the library data (Step SB473 in FIG. 11). Then, the library in the ladder program of the corresponding machine 3 is updated on the basis of the obtained library information (Step SB474 in FIG. 11), and the subroutine ends.

Next, the flow returns to FIG. 10, and the library version number corresponding to the identification information in the incorporated-information storage area 11 is updated to the library version number contained in the library information of the added/updated library data in the library storage area 12 (Step SB48 in FIG. 10). Then, next identification information is obtained (Step SB49 in FIG. 10), and it is determined whether next identification information was obtained (Step SB50 in FIG. 10). If next identification information was obtained, the processing from Step SB43 to Step SB49 is repeated. If next identification information was not obtained, the reference information and the identification information and library version number of the machine 3 in the next record are obtained (Step SB51 in FIG. 10). It is determined whether the reference information and the identification information and library version number of the machine 3 in the next record was obtained (Step SB52 in FIG. 10). As long as the reference information and the identification information and library version number of the machine 3 in the next record can be obtained, the processing from Step SB43 to Step SB51 is repeated, and otherwise, the processing ends.

By doing so, the library version number of the library data is updated, and, even if the version number of the library incorporated into the machine 3 becomes old, the library can be automatically updated. As a result, the library maintainability can be enhanced.

Although the embodiment of the present invention has been described above in detail with reference to the drawings, specific configurations are not limited to those in the embodiment, and design changes etc. that do not depart from the scope of the present invention are also encompassed.

As a result, the above-described embodiment leads to the following aspect.

According to one aspect, the present invention provides a ladder-library management apparatus that manages a library incorporated into a ladder program used in a machine connected via a network, the ladder-library management apparatus including: an incorporated-information storage area that stores incorporated information in which the machine is associated with identification information of a device connected to the machine and a version number of the library used for the device; a library storage area that stores library data in which the identification information, information about the device having the identification information, and information about the library used in the device having the identification information are associated with each other; and a library server that adds or updates the library provided in the machine on the basis of the library data stored in the library storage area and that updates the incorporated information stored in the incorporated-information storage area.

According to the ladder-library management apparatus of the above-described one aspect of the present invention, the incorporated-information storage area stores incorporated information in which a machine connected via a network is associated with identification information of a device connected to the machine and a version number of a library used for the device. Furthermore, the library storage area stores library data in which identification information, information about a device having this identification information, and information about a library used in the device having this identification information are associated with each other. Then, the library server adds or updates the library provided in the machine on the basis of the library data stored in the library storage area and also updates the incorporated information stored in the incorporated-information storage area.

By doing so, centralized management of addition/updating of the library incorporated into the machine connected via the network can be achieved. Thus, even when a plurality of machines are connected via the network, there is no need to manually manage the library for each machine, thus making it possible to enhance the maintainability of the library.

In the ladder-library management apparatus of the above-described one aspect of the present invention, the library server may be provided with: a connection determining unit that determines whether a new device has been connected to the machine; a library-data searching unit that searches the library storage area for the library data that has identification information matching identification information of the new device; and a library adding unit that adds the library to the machine on the basis of the searched-for library data.

According to this configuration, the connection determining unit determines whether a new device has been connected to the machine, the library-data searching unit searches the library storage area for library data having identification information matching the identification information of the new device, and the library adding unit adds the library to the machine on the basis of the searched-for library data.

Accordingly, when a new device, such as a temperature sensor, is added to the machine, the library can be automatically added to the ladder program included in the machine.

In the above-described configuration, the library-data searching unit may request the library data that has identification information matching the identification information of the new device, from another ladder-library management apparatus connected via the network.

By doing so, if the library storage area has no library data that has identification information matching the identification information of the new device, it is possible to perform search by expanding the search range to the other ladder-library management apparatus.

In the ladder-library management apparatus of the above-described one aspect of the present invention, the library server may be provided with: a library-data obtaining unit that obtains new library data through an operation by an operator or from another ladder-library management apparatus; a library-storage-area updating unit that updates the library storage area on the basis of the obtained new library data; and a library updating unit that updates the library provided in the machine on the basis of the new library data, when a library version number contained in the new library data stored in the updated library storage area is newer than the library version number stored in the incorporated-information storage area.

According to this configuration, the library-data obtaining unit obtains new library data through an operation by the operator or from the other ladder-library management apparatus, the library-storage-area updating unit updates the library storage area on the basis of the obtained new library data, and the library updating unit updates the library provided in the machine on the basis of the new library data, when the library version number contained in the new library data stored in the updated library storage area is newer than the library version number stored in the incorporated-information storage area.

By doing so, when the version number of the library stored in the library storage area becomes new, the version number of the library incorporated into the machine can be automatically updated.

According to the present invention, an advantageous effect is afforded in that the maintainability of a ladder library can be enhanced.

The invention claimed is:

1. A ladder-library management apparatus that manages a library incorporated into a ladder program used in a machine connected via a network, the ladder-library management apparatus comprising:
an incorporated-information storage area that stores incorporated information in which the machine is associated with identification information of an I/O device connected to the machine and a version number of the library used for the I/O device;

a library storage area that stores library data for use of the I/O device connected to the machine, in which the identification information, information about the I/O device having the identification information, and information about the library used in the I/O device having the identification information are associated with each other; and a library server that adds or updates the library provided in the machine on the basis of the library data stored in the library storage area and that updates the incorporated information stored in the incorporated-information storage area.

2. A ladder-library management apparatus according to claim 1, wherein the library server is provided with:

a connection determining unit that determines whether a new I/O device has been connected to the machine;

a library-data searching unit that searches the library storage area for the library data that has identification information matching identification information of the new I/O device; and a library adding unit that adds the library to the machine on the basis of the searched-for library data.

3. A ladder-library management apparatus according to claim 2, wherein the library-data searching unit requests the library data that has identification information matching the identification information of the new I/O device, from another ladder-library management apparatus connected via the network.

4. A ladder-library management apparatus according to claim 1, wherein the library server is provided with:

a library-data obtaining unit that obtains new library data through an operation by an operator or from another ladder-library management apparatus;

a library-storage-area updating unit that updates the library storage area on the basis of the obtained new library data; and a library updating unit that updates the library provided in the machine on the basis of the new library data, when a library version number contained in the new library data stored in the updated library storage area is newer than the library version number stored in the incorporated-information storage area.

* * * * *